UNITED STATES PATENT OFFICE.

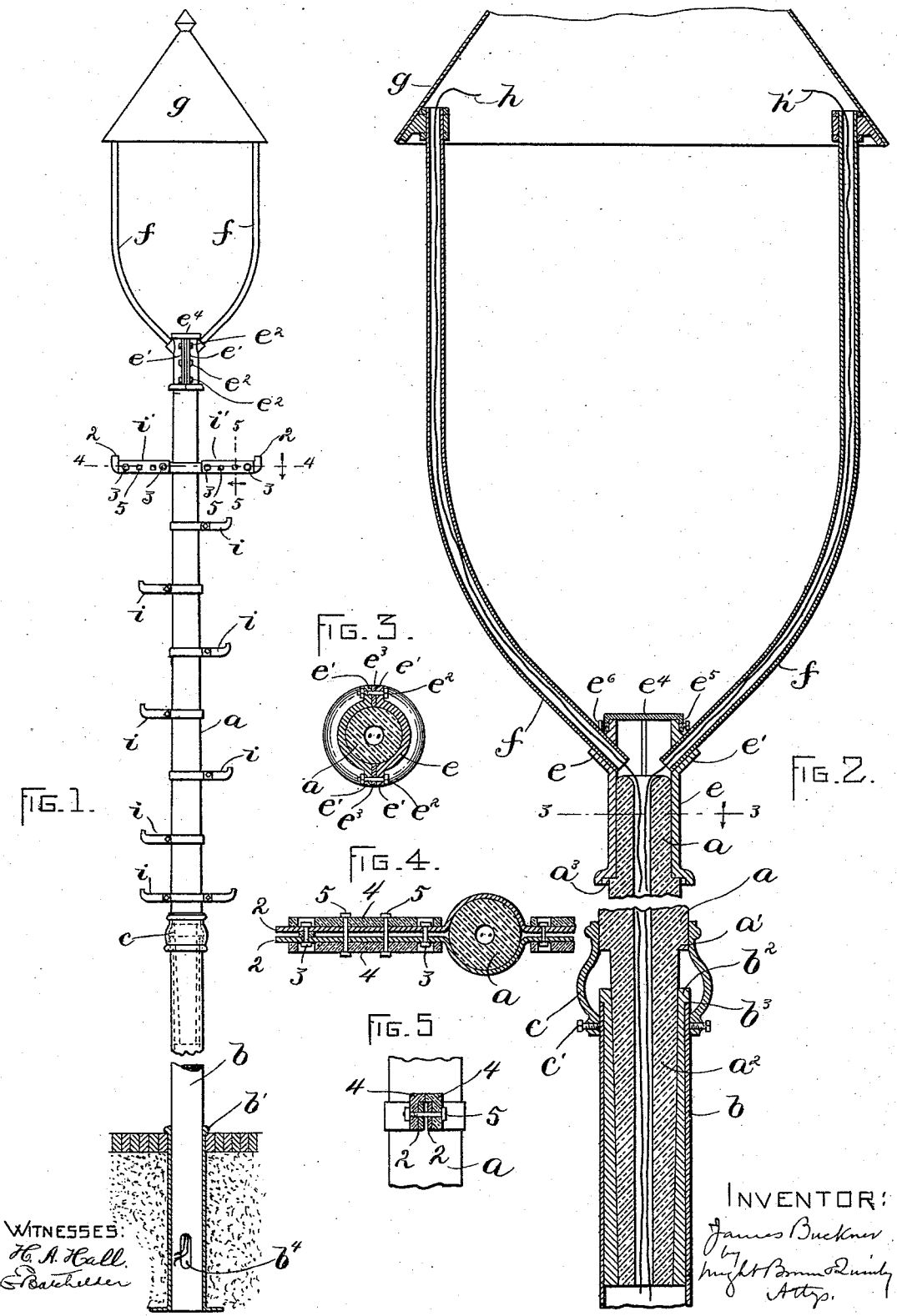

JAMES BUCKNER, OF BOSTON, MASSACHUSETTS, ASSIGNOR TO THE BOSTON ELECTRIC INSULATED POLE COMPANY, OF SAME PLACE.

ELECTRIC-LAMP POST.

SPECIFICATION forming part of Letters Patent No. 572,354, dated December 1, 1896.

Application filed December 26, 1895. Serial No. 573,271. (No model.)

*To all whom it may concern:*

Be it known that I, JAMES BUCKNER, of Boston, in the county of Suffolk and State of Massachusetts, have invented certain new and useful Improvements in Electric-Lamp Posts, of which the following is a specification.

This invention has for its object to provide a simple, strong, and durable post for electric-arc lamps adapted to effectually insulate a lineman supported on the post from the ground.

The invention consists in the improved construction which I will now proceed to describe and claim.

Of the accompanying drawings, forming a part of this specification, Figure 1 represents a side elevation of a lamp-post embodying my improvements. Fig. 2 represents a longitudinal section of the same on a larger scale, portions being broken away. Fig. 3 represents a section on line 3 3 of Fig. 2. Fig. 4 represents a section on line 4 4 of Fig. 1. Fig. 5 represents a section on line 5 5 of Fig. 1.

The same letters and figures of reference indicate the same parts in all the figures.

My improved pole is composed, chiefly, of an elongated wooden section $a$ and a tubular metal base-section $b$. The section $b$ is preferably of wrought-iron and is inserted in the ground or, as I prefer, in a cast-iron socket $b'$, inserted in the ground. In the upper end of this section $b$ is inserted a metal socket-piece $b^2$, having a shoulder $b^3$, resting on the upper end of the tubular section $b$, said socket-piece being internally tapered or reduced in diameter from its upper to its lower end. The wooden section $a$ is tapered or gradually reduced in diameter from a shoulder $a'$ at its lower portion to its upper end and is provided below the shoulder $a'$ with a tapered extension or shank $a^2$, which is formed to fit the tapered socket $b^2$ and to extend downwardly a considerable distance into said socket and into the tubular section $b$. The shoulder $a'$ on the wooden section is located some distance above the upper end of the socket $b^2$, provision being thus made for a downward movement of the shank $a$ of the wooden section into the socket in case of shrinkage of the wood, a firm and solid bearing of the wooden section on the metal or base section being thus insured.

$c$ represents a collar attached by screws $c'$ to the upper portion of the base-section $b$, said collar extending across the space and between the section $b^2$ and the shoulder $a'$ and covering said shoulder without being attached to the wooden section $a$, so that said section is free to move downwardly in the collar $c$ to any extent that may be required by the shrinkage of the wood.

The upper portion of the wooden section $a$ is reduced in diameter above a shoulder $a^3$, formed on said section near its upper end, the reduced portion fitting a metal collar $e$, the lower end of which rests upon the shoulder $a^3$, said collar being preferably composed of two sections having ears $e'$, connected by bolts $e^2$.

The collar $e$ is provided near its upper end with inclined sockets $e'\ e'$, in which are inserted tubular arms $f\ f$, which serve not only to support the hood $g$ and the lamp mechanism, (not shown,) but also as conduits for the wires or electrical conductors $h\ h'$, said conductors passing through the arms $f\ f$, as shown in Fig. 2, and through a passage formed longitudinally through the wooden section $a$.

$e^3\ e^3$ represent strips of rubber or other packing material inserted between the sections of the collar $e$ to exclude moisture from the upper end of the wooden section, the upper end of the collar being provided with a cap $e^4$ for the same purpose, said cap having a flange $e^5$, which extends downwardly upon the collar $e$ and is secured thereto by screws $e^6$. The described construction of the collar $e$ enables it to effectually exclude water from the opening in the wooden section.

$i\ i$ represent steps secured to the wooden section $a$ by suitable means, such as a clamping-ring formed upon each step and encircling the section $a$, the tapering form of said section enabling it to firmly support the said rings and steps. Near the upper end of the section $a$ is a double step $i'$, projecting from opposite sides of the post and composed of two metal strips 2 2, secured together and to the post by bolts 3 3 and wooden strips 4 4, secured to the strips 2 2 by bolts 5 5, said wooden strips projecting slightly above the metal strips 2 2, so that they constitute rests for the feet of the lineman when he desires to stand upon the step $i'$. The upper portions of the wooden strips are provided with inwardly-projecting offsets, which meet above the metal strips 2 2, as shown in Fig. 5, and furnish a continuous wooden surface or tread.

The tubular base-section is firmly secured to the socket $b^2$, which is preferably of cast-iron, by expanding the tubular section by heat and then allowing it to shrink upon the socket, the latter closely fitting the tubular section when it is expanded.

The wooden section is preferably impregnated with an insulating material, such as tar or any other suitable material, which may be applied by immersing the wood for a considerable length of time in a bath of the material, the latter being heated to the boiling-point, or thereabout.

The base-section $b$ and its receiver $b'$ are provided with connecting-slots $b^4$, through which the wires $h\ h'$ pass. The joint between the section $b$ and receiver $b'$ is packed or tamped with lead to prevent moisture from entering between the two parts.

I claim—

1. The improved insulating lamp-post, comprising the tubular metallic base-section having a tapered socket, and the elongated wooden section having a metallic lamp-holder at its upper end and a tapered shank at its lower end of greater length than the said socket, and the said socket being supported with an unobstructed space below the tapered shank whereby the said tapered shank and socket may automatically compensate for shrinkage of the wooden section and maintain a firm connection between the two, and a collar surrounding the meeting points of the two sections at the top of the base-section, said collar being secured to one of said sections and adapted to move vertically on the other section.

2. An electric-lamp post comprising the elongated wooden section, the tubular metallic base-section receiving the lower end of the wooden section, the collar fitting on the upper end of the wooden section and composed of flanged sections bolted together and provided with packing-strips, said collar having a flanged detachable cap covering its upper end, and the lamp-supporting arms secured to said collar.

3. An electric-lamp post comprising the tubular metallic base-section, the tapered wooden section, and the double step or cross-arm composed of the metal strips clamped upon the wooden section, and the wooden strips clamped upon the metal strips.

4. An electric-lamp post comprising the tubular metallic base-section having a tapered socket, the wooden section having a reduced tapered shank fitting said socket, and the collar secured to the base-section and loosely encircling the wooden section above said shank.

5. The improved insulating lamp-post comprising the tubular metallic base-section $b$, having a metal socket-piece $b^2$ provided with a shoulder $b^3$, and fitting inside the section $b$, the said socket-piece being internally tapered, the elongated wooden section having a metallic lamp-holder at its upper end and a tapered shank at its lower end of greater length than the said socket-piece, and the said socket being supported with an unobstructed space below the tapered shank of the wooden section, whereby the said tapered shank and socket may automatically compensate for shrinkage of the wooden section, and maintain a firm connection between the two sections.

6. The combination with the cast-iron socket $b'$ adapted to be inserted in the ground, of the tubular base-section $b$ fitting said socket $b'$ and extending above the ground, and having a tapered socket, and the wooden section $a$ having the tapered shank $a^2$ formed to fit the said tapered socket.

In testimony whereof I have signed my name to this specification, in the presence of two subscribing witnesses, this 21st day of December, A. D. 1895.

JAMES BUCKNER.

Witnesses:
E. BATCHELDER,
A. D. ADAMS.